Figure 2:
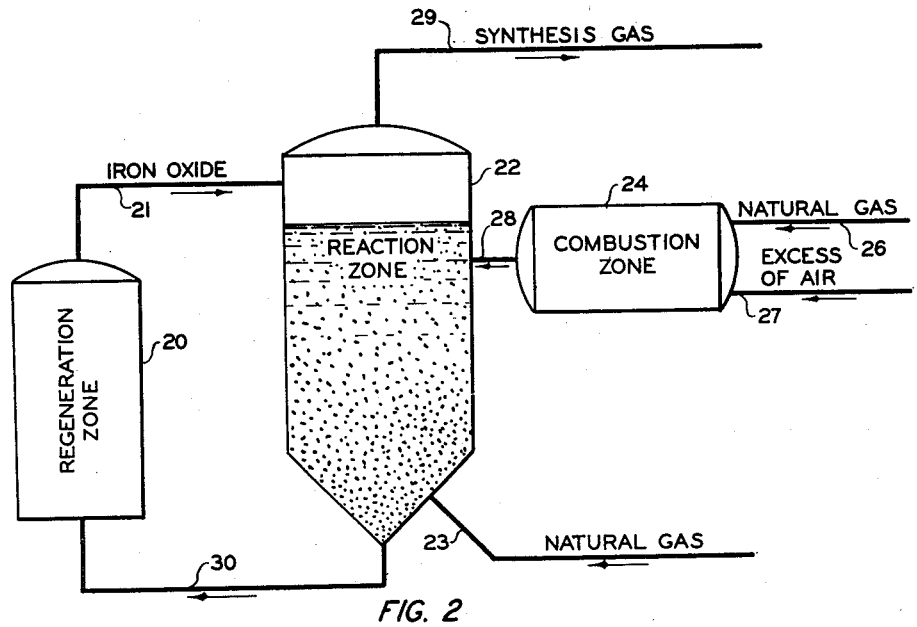

Patented Feb. 10, 1953

2,628,161

UNITED STATES PATENT OFFICE 2,628,161

FLUIDIZED IRON OXIDE-NATURAL GAS PROCESS FOR MANUFACTURING SYNTHESIS GAS

Bertrand J. Mayland, Bartlesville, Okla., assignor to Phillips Petroleum Company, a corporation of Delaware Application September 17, 1948, Serial No. 49,826

2 Claims. (Cl. 48—196)

This invention relates to a process for the manufacture of carbon monoxide and hydrogen. In one of its more specific aspects, it relates to an improved fluidized bed process for the manufacture of carbon monoxide and hydrogen synthesis gas by the oxidation of methane or natural gas with oxides of the metals in the VIII group of the 4th series of the periodic table, and preferably iron oxide, wherein a gaseous oxidant is introduced to the reaction zone.

One method for making synthesis gas comprising carbon monoxide and hydrogen by use of a fluidized bed is disclosed in the copending application of B. J. Mayland and A. Clark, Serial No. 43,320, filed August 9, 1948, now U. S. Patent 2,566,620, issued September 4, 1951. By the process of that invention, methane is contacted with iron oxide in a fluidized bed at an elevated temperature thus converting the methane by the process of oxidation into carbon monoxide and hydrogen. At least a portion of the heat of the above reaction may be supplied by the iron oxide which is heated to about 2500° F. in a regeneration zone in the presence of air which reoxidizes the reduced iron.

Several problems arise in connection with such a procedure which are solved by the use of my invention disclosed herein. One inherent problem in all processes is that of obtaining maximum yields of product materials per volume of reactants. Another problem specific to the process of the above-identified copending application is obtaining the proper ratio of carbon monoxide to hydrogen in the product gas. Still another problem is to obtain sufficient heat in the reaction zone, where the methane is oxidized, to maintain the reaction at its optimum temperature for best operation without having to circulate too great a quantity of iron oxide. This particular problem is solved in part in the copending application by the use of a heat transfer material which is heated along with or separate from the iron oxide.

It is an object of this invention to provide an improved process for the manufacture of carbon monoxide and hydrogen. Another object is to produce carbon monoxide and hydrogen synthesis gas by the oxidation of methane. Another object is to obtain a maximum yield of carbon monoxide and hydrogen per volume of methane treated. Another object is to obtain carbon monoxide and hydrogen synthesis gas in maximum quantities from the oxidation of natural gas with iron oxide. Still another object is to manufacture carbon monoxide and hydrogen in maximum quantities by the oxidation of methane by introducing a gaseous oxidant to a fluidized bed reaction zone. Another object is to produce carbon monoxide and hydrogen synthesis gas by the oxidation of methane with iron oxide wherein a gaseous oxidant is used to react with a portion of the methane which would remain unreacted in the absence of such an oxidant. Another object is to adjust the ratio of hydrogen to carbon monoxide in synthesis gas as desired. Further objects and advantages of this invention will be apparent to one skilled in the art from the accompanying disclosure and discussion.

I have discovered that by introducing a gaseous oxidant, in particular steam, carbon dioxide, and/or oxygen to a fluidized reaction zone wherein carbon monoxide and hydrogen are being produced by the oxidation of methane with iron oxide, a maximum portion of the methane is reacted, giving a greater yield than would be had when not using a gaseous oxidant. I have further discovered that by using certain of these oxidants or mixtures thereof that additional heat for the reaction may be obtained.

The following discussion will serve to describe and exemplify my invention.

My process is a reaction based on the oxidation of methane under controlled conditions. The most readily available source of methane for such a reaction is from natural gas. However, my invention is not to be limited by the means of obtaining methane.

In a synthesis gas preparation process as described above and in copending application Serial No. 43,320, filed August 9, 1948, now U. S. Patent 2,566,620, issued September 4, 1951, it is disclosed that the range of oxygen in the iron oxide bed for the synthesis gas reaction is approximately 18 to 23 weight per cent. Best operation is obtained when the oxygen content of the iron oxide is maintained at about 19 weight per cent, and when the iron oxide is introduced at about 2500° F. and is removed at about 1600° F., the latter being the optimum operating temperature of the reaction zone. Under these conditions, natural gas, for example one having a composition of 8 per cent nitrogen and 92 per cent hydrocarbon (mostly methane), will give an effluent having a composition (dry basis) of about 28.8 per cent carbon monoxide, 49.8 per cent hydrogen, 1.2 per cent carbon dioxide, 17.1 per cent methane, and 3.1 per cent nitrogen. A lower hydrocarbon content can be obtained, but when this is done by changing the conditions of operation there is an increased tendency toward the formation of carbon which indicates that the hydrocarbon is being cracked rather than reformed. The ratio of carbon monoxide to hydrogen in this particular case would be 1:1.73.

By the practice of this invention wherein a gaseous oxidant is introduced to the reaction zone, the 17.1 per cent of unreacted methane is greatly reduced and little or no carbon is formed. In addition to this, the ratio of carbon monoxide to hydrogen may be varied depending upon the gaseous oxidant used. For instance, steam will increase the proportion of hydrogen, carbon dioxide will reduce it, and oxygen will maintain it substantially the same. The following table will show the ratio of carbon monoxide and hydrogen formed when steam, oxygen and carbon dioxide are reacted with methane, the principle hydrocarbon constituent of natural gas.

*Table I*

| (1) | $CH_4 + H_2O \rightarrow CO + 3H_2$ | Ratio 1:3 |
| (2) | $CH_4 + \frac{1}{2}O_2 \rightarrow CO + 2H_2$ | Ratio 1:2 |
| (3) | $CH_4 + CO_2 \rightarrow 2CO + 2H_2$ | Ratio 1:1 |

In one embodiment of this invention wherein the gaseous oxidant used is steam, said steam is introduced in the upper portion of the reaction zone and within the fluidized bed in such a manner that it contacts and reacts with the residual hydrocarbon in the presence of partially reduced iron oxide which catalyzes the reaction of steam and methane to form carbon monoxide and hydrogen. In this embodiment, the steam is preheated and introduced to the fluidized bed at a temperature in the range of 900 to 1500° F. and in an amount of about 0.05 to 1 mol, but preferably 0.15 mol, per mol of methane treated. If the reaction is allowed to reach equilibrium, which in commerical operation it is not, there would be an increase in yield of carbon monoxide and hydrogen of 58 per cent and also the per cent of inert material would decrease. In commercial operation, the reaction of steam and methane will not attain equilibrium, but will only approach it. How close it will come depends on the contact time allowed.

In another ombodiment of my invention, oxygen or an oxygen-containing gas such as air, is used as the gaseous oxidant. This may be introduced in several ways. For example, one method for introducing oxygen to the reaction zone is to burn a portion of methane or natural gas with an excess of air in a combustion chamber and then pass the hot product gases, which include the excess of oxygen, to the reaction zone wherein methane is being oxidized to carbon monoxide and hydrogen. By introducing these hot materials to the reaction zone in the vicinity of the outlet for the synthesis gas produced therein but within the fluidized bed in such a manner that they contact the gases to be withdrawn, there is supplied additional heat for the reaction and oxygen to react with the methane which would ordinarily pass unreacted through the reaction zone. In addition to this, there is also some oxidation of the synthesis gas already produced which adds still more heat to the reaction zone. This heat is made available throughout the reaction zone by virtue of the fact that the iron oxide particles move rapidly within all parts of the fluidized bed.

Another method for introducing oxygen or air to the reaction zone of a fluidized iron oxide-methane synthesis gas process is to introduce the gaseous oxidant directly to the reaction zone in the same manner as described in the first embodiment above. In this manner of operation, the oxygen reacts with the methane which would have passed through the reaction zone unreacted and also burns with some of the already formed synthesis gas to furnish additional heat.

In either of the two methods for practicing this embodiment, the amount of oxygen, as such, is calculated so that the desired volume of unreacted methane is oxidized, and if desired, the right amount of heat is supplied. In either of these two methods, the ratio of carbon monoxide to hydrogen remains about 1:2.

A third embodiment of my invention comprises introducing carbon dioxide to the reaction zone. In this embodiment, the carbon dioxide is preferably heated to an elevated temperature by such means as, for example, heat exchange with the product synthesis gas, and then passed to the reaction zone as in the other embodiments. By operating in this manner, the methane which would have passed through the reaction zone unoxidized is reacted producing addition synthesis gas. Further than this, the ratio of carbon monoxide to hydrogen is changed, increasing the amount of carbon monoxide.

It is well within the scope of my invention to introduce two or more of the gaseous oxidants to the reaction zone either together or separately, the proportions being selected to give the desired amount of heat and desired final composition of synthesis gas.

In any of the above embodiments of my invention, natural gas may be substituted for methane, particularly because it is more readily available, and because pure methane would be too expensive to use. It is also within the scope of my invention to utilize other light paraffin hydrocarbons in place of methane. The ratio of $H_2/CO$ obtained with these hydrocarbons can be varied by addition of steam or carbon dioxide. Such light paraffins as ethane, propane, and butane are quite suitable.

A further understanding of some of the many aspects of my invention may be had by referring to the drawings, which are schematic flow diagrams, in conjunction with the following discussion. Various additional valves, pumps, and other conventional equipment, necessary for the practice of this invention, will be familiar to one skilled in the art and have been omitted from the drawings for the sake of clarity. These descriptions of the drawings provide two methods of operating my process. It is understood, however, while these are representative in general of my process, various minor changes may be made in adapting the process to the various conditions within the scope of the invention.

Figure 1:
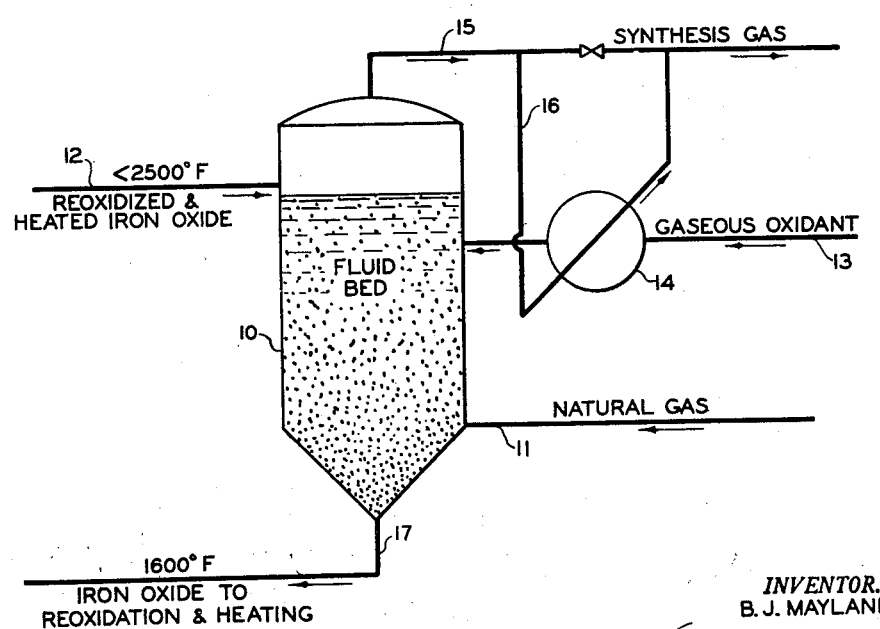

Refer now to Figure 1 which is one embodiment of my invention. Natural gas is introduced near the bottom of reaction chamber 10 via line 11. Iron oxide, freshly oxidized and heated, is introduced to chamber 10 via line 12 where it oxidizes the natural gas to carbon monoxide and hydrogen according to Equation 2 above and where it is maintained in a fluid state by the flow of gases therethrough. A gaseous oxidant such as steam, oxygen, carbon dioxide, or a mixture thereof is introduced to chamber 10 via line 13 and heat exchanger 14 to further react with natural gas which has not been oxidized by the hot iron oxide. Effluent synthesis gas is removed from the top of chamber 10 via line 15. A portion of this is passed via line 16 to heat exchanger 14 where it imparts heat to the gaseous oxidant. Cool reduced iron oxide is removed from the bottom of chamber 10 via line 17 to a regeneration unit not shown where it is heated and reoxidized.

Refer now to Figure 2 which is another embodiment of my invention. Hot regenerated iron oxide is passed from regeneration zone 20 via line 21 to reaction zone 22. Natural gas to be oxidized is introduced to the reaction zone via line 23 in such a manner that the iron oxide introduced near the top of the zone is maintained in substantially a fluidized bed. Within the reaction zone the methane in the natural gas is oxidized by the oxygen from the iron oxide to produce synthesis gas. Natural gas and air are introduced to a combustion zone 24 via lines 26 and 27 where the gas is burned with an excess of air producing an oxygen-rich hot gas mixture. This mixture is passed from zone 24 via line 28 into reaction zone 22 near the top of the fluidized bed. In this manner, additional heat for the reaction is supplied and any unreacted methane is oxidized by the excess oxygen. Effluent synthesis gas is removed from zone 22 via line 29 and used as desired. Reduced iron oxide is removed from the bottom of zone 22 via line 30 and passed to regeneration zone 20 where it is reoxidized and heated.

The term "fluidized" as used herein in connection to a metal oxide bed or a process, refers to the condition where a particulate mass is maintained in a high state of agitation, turbulence, or ebullition by the flow of gases therethrough. In this invention, the gas maintaining the metal oxide in a fluidized state is methane, or a methane-rich gas, such as natural gas.

One of the main advantages of this invention is to reduce the volume of unreacted methane which passes through the reaction zone of a fluidized iron oxide-methane process for making carbon monoxide and hydrogen synthesis gas. Another advantage of my process is the addition of heat to the reaction zone which reduces the amount of heat necessarily supplied by the iron oxide or other solid heat carrier.

Although this process has been described and exemplified in terms of its preferred modifications, it is understood that various changes may be made without departing from the spirit and scope of the disclosure and of the claims.

I claim:

1. An improved process for the manufacture of carbon monoxide and hydrogen synthesis gas which comprises maintaining in a synthesis gas producing zone a first bed of small solid particles of iron oxide in a fluidized condition by suspension in a gas flowing at a sufficiently low rate that the bulk of the particles are maintained together as a dense highly agitated phase, introducing said iron oxide at a temperature in the range of 2000 to 2500° F. into an upper portion of said fluidized bed, introducing natural gas to a lower portion of said fluidized bed as said gas, maintaining a temperature above about 1600° F. and just below the regeneration temperature of said iron oxide in said fluidized bed to liberate oxygen from said iron oxide and to oxidize said natural gas and thereby produce carbon monoxide and hydrogen synthesis gas, containing unoxidized natural gas, introducing an oxidant selected from the group consisting of steam, oxygen, and carbon dioxide from an external source directly to the upper portion only of said synthesis gas producing zone in close proximity to the outlet for product synthesis gas and within the fluidized bed in sufficient quantity to react in the presence of partially reduced iron oxide with the natural gas which would pass through said reaction zone unreacted in the absence of such added oxidant, thereby producing a greater quantity of synthesis gas per volume of natural gas introduced to said reaction zone, removing synthesis gas from the top of said zone, removing reduced iron oxide at a temperature of about 1600° F. from a lower portion of said fluidized bed and passing same to a regeneration, oxidizing said reduced iron oxide in the presence of hot combustion gases containing free oxygen to such an extent that when it is returned to said fluidized bed the oxygen content of the iron oxide therein is maintained in the range of 18 to 23 weight per cent, said combustion gases maintaining said iron oxide in a second fluidized bed, and returning said oxidized iron oxide from said second fluidized bed to said first fluidized bed.

2. A process according to claim 1 wherein the natural gas is comprised substantially of methane.

BERTRAND J. MAYLAND.

REFERENCES CITED

The following references are of record in the file of this patent:

UNITED STATES PATENTS

| Number | Name | Date |
| --- | --- | --- |
| 1,960,912 | Larson | May 29, 1934 |
| 2,425,754 | Murphree et al. | Aug. 19, 1947 |
| 2,513,994 | Davidson | July 4, 1950 |